Nov. 14, 1961 C. A. STEPHAN 3,008,208
WIRE ROPE SPLICING SLEEVE
Filed March 10, 1958
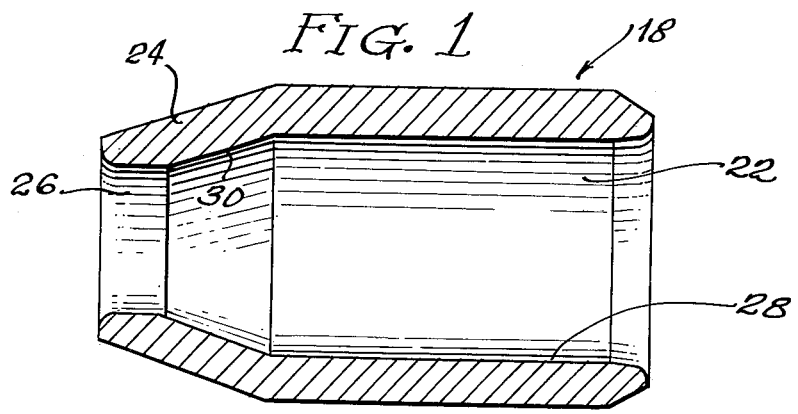
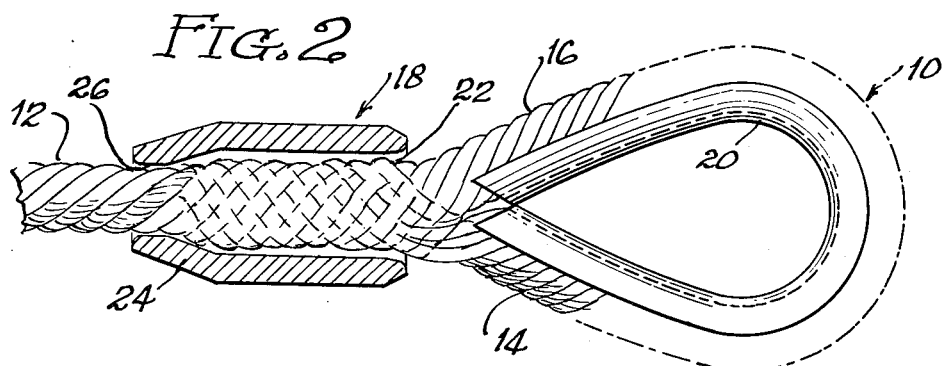
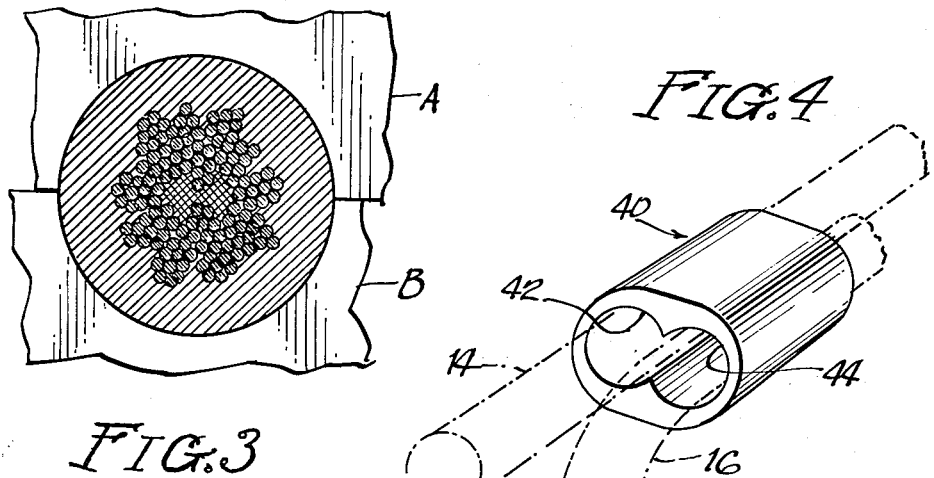
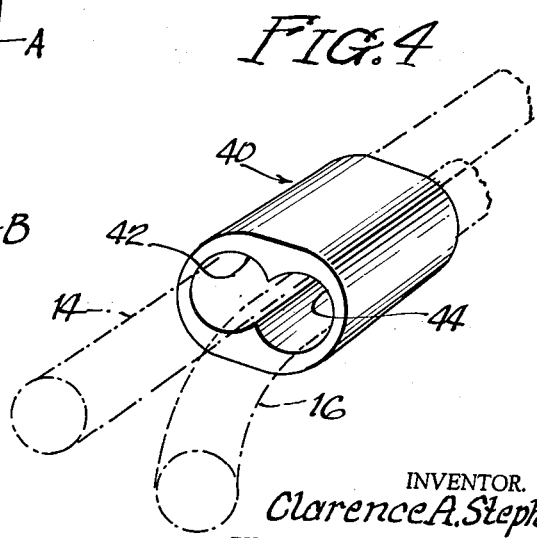
INVENTOR.
Clarence A. Stephan
BY
Ooms, McDougall, Williams & Hersh
Attorneys

United States Patent Office 3,008,208
Patented Nov. 14, 1961

3,008,208
WIRE ROPE SPLICING SLEEVE
Clarence A. Stephan, 8343 Baring Ave., Munster, Ind.
Filed Mar. 10, 1958, Ser. No. 720,493
1 Claim. (Cl. 24—123)

This invention relates to the splicing of metal wire rope and more particularly to a metal sleeve for use in effecting same.

It is addressed chiefly to a sleeve for use in the fabrication of eyes in metal rope wherein the rope is looped to form an eye while portions of the rope at the base of the eye are joined one with the other by compressing or swaging a metal sleeve thereabout. It will be apparent that the sleeve member can be used for joining two sections of the same or separate ropes for splicing and that similar means can be employed for joining the dead end of a rope with a portion spaced from the end to provide a loop or eye therebetween.

It is an object of this invention to provide a new and improved sleeve whereby an improved splice can be secured in a simplified and efficient manner with less force and compression thereby to enable such splices or loops to be fabricated in the field or in other stations of use to meet specific requirements as distinguished from the necessity to make use of prefabricated loops manufactured at distant stations.

These and other objects and advantages of this invention will hereinafter appear and for purposes of illustration, but not of limitation, embodiments of the invention are shown in the accompanying drawing in which:

FIG. 1 is a sectional view of a preferred sleeve embodying the features of this invention;

FIG. 2 is a perspective view partially in section of a sleeve and rope assembly prior to die compression;

FIG. 3 is a cross-sectional view through the assembled sleeve and rope, and

FIG. 4 is a perspective view of a modification in the sleeve construction.

The invention will be described with reference to a preferred application of the sleeve in the fabrication of an eye or loop 10 in the end of a wire rope 12. It will be understood, however, that the concepts described have application in the formation of loops in intermediate portions of the rope or in splicing ropes together.

Referring now to the drawing, the rope 12 is of conventional construction embodying a loop 10 formed when the dead end 14 of the rope is turned back upon a portion 16 of the rope spaced from the end and to which it is joined by compressing or swaging while within a sleeve 18 embodying the features of this invention. The eye or loop can be provided with a thimble 20 for support although the lining or thimble may be omitted for various uses.

In operation, the end 14 of the rope is first threaded through the bore 22 of the sleeve. The end 14 is then turned back to form the loop 10 and the strands or wires of the dead end are unraveled for more uniform distribution about the live portion of the rope to which it is to be secured and preferably for interweaving the rope for more effective joinder therewith. After proper arrangement of the rope strands, the sleeve 18 is displaced endwise along the rope to bring the joined portion within the bore 22. The sleeve is then compressed as between die parts A and B, to cause deformation of the sleeve about the wire to effect an assembled relationship therebetween. Instead and some times more desirably even, the end portion of the rope may be unraveled to enable the strands at the end of the rope to be intertwined with the strands at the base of the eye or sling with the cores in between. The strands in the portion of the rope forming the eye will fall in place to produce a structure having some strength in assembly in itself.

The sleeve is formed to a cylindrical shape throughout the major portion of its length with a conically shaped end portion 24 of decreasing diameter. The bore 22 within the sleeve is formed of sections of different diameters with a section 26 of smallest diameter in the conically shaped end portion 24 and the section 28 of greatest diameter in the elongate cylindrical section and with a tapered portion 30 of frusto-conical shape joining the section of larger diameter with the section of smaller diameter. The bore of smaller diameter is dimensioned to be slightly larger than the diameter of the rope so as to enable the sleeve to be displaced endwise along the rope. The bore of larger diameter is dimensioned to be slightly larger than the cross-section of the portion of the rope about which the strands of the dead end are distributed above the live rope. Thus the sleeve 18 can be displaced endwise along the rope until the intertwined portion engages the frusto-conical section 30 of decreasing dimension in the bore.

During compression, the metal in the sleeve is caused to flow about and into the spaces between the strands of the wire with the tapered end portion engaging the live wire therebetween while the cylindrical portion effects common engagement between adjacent sections of the wire to effect joinder therebetween. Because of the tapered section, some elongation will occur but a centered relationship will be maintained because of the described bore construction so that a complete and effective joinder will be achieved without causing displacement of the wires out of alignment whereby full load would not be taken in tension.

The sleeve members have been fabricated of a number of different metals and alloys but a number of deficiencies have been found to exist in the use of such metals and alloys as have heretofore been employed. The deficiencies in the use of steel, of which most of the sleeves have been produced, reside in the excessive weight of the steel parts; the tremendous force required to compress and deform the steel sleeve to effect joinder of the wire members, and the inability to achieve metal flow sufficient substantially completely to fill the spaces between the metal strands of the wire and between the metal strands and the compressed sleeve to produce a solid structure of maximum strength.

In practice, compression and deformation of the sleeve about the metal wires has required the use of presses capable of development of pressures in the order of 500–1000 tons or better. Such presses are of considerable bulk and usually require installation on a solid foundation. This militates against the transportability of the press for use at various locations. Thus in the use of sleeves formed of steel, eye formation and splicing must be done at a common location which may be distant from the area of use. This requires that a large inventory of splices and eyes be maintained at various convenient locations for possible subsequent use or that the eyes and splices be custom-made to order with a resultant considerable delay between the time of need and the delivery for use.

Further, steel sleeves are incapable of the flow characteristics desired completely to fill in the areas about and between the wire strands, even when tremendous pressures are employed. As a result, optimum strength is incapable of full development in the splice.

Some of these deficiencies have been overcome, in part, by the use of sleeves formed of cast aluminum but others of the deficiencies remain and still others develop. Cast aluminum sleeves provide considerable savings in weight over sleeves formed of steel and somewhat lesser force is required for compression to form the splice. However, cast aluminum sleeves are relatively porous and somewhat deficient from the standpoint of the strength of the splice by comparison with splices formed in accordance with the practice of this invention.

It has been found that deficiencies of the type heretofore described can be substantially completely overcome and a splice of increased strength and utility produced when use is made of a sleeve member formed of aluminum which has been cold worked in its formation and in which the grain structure is predominantly oriented with the contour of the sleeve and extending mostly linearly in the lengthwise direction. Sleeve structures embodying the characteristics described can be formed by extrusion and preferably by impact extrusion into suitable dies.

Upon extrusion to form the aluminum sleeve, the porosity characteristics of a cast aluminum sleeve are substantially completely eliminated so that a solid structure capable of solid metal flow upon compression is secured.

Formation by impact extrusion provides a cold worked aluminum sleeve having the grain lines desirably oriented along the contour of the sleeve and preferably in an aligned linear direction to provide considerably greater strength in a direction where maximum strength is desired in the compressed part in formation of the splice. Such orientation and grain structure is not available in sleeves formed of cast aluminum or of machined aluminum parts. As a result, the strength of the splice is considerably less when formed of such cast aluminum or machined parts by comparison with that secured by a sleeve embodying the concepts of this invention when employed in the same dimension and in the same application. It has been found further that a splice produced by a sleeve embodying the features of this invention is subject to less failure by fatigue than when the splice is formed of a sleeve of cast aluminum or a machined part.

It is believed that the freedom of porosity and the described grain structure in the sleeve embodying the features of this invention permits a greater amount of metallic flow to be achieved with less force thereby to produce a better splice by comparison with the sleeve formed of steel or of cast aluminum. It has been found that the desired flow characteristics of a sleeve embodying the features of this invention can be achieved with pressures in the ratio of 100 tons per inch of rope diameter. As an example, a 75-ton press can be used with a ¾ inch rope. Usually the outside diameter of the sleeve will be about two and one-half times the rope diameter. This is less than one-fifth the force required for compression of a steel sleeve of equivalent size and it is considerably less force than is required for a sleeve of the same dimension formed of cast aluminum. Thus a force sufficient for compression of the extruded sleeve is capable of being developed in portable presses thereby to enable a splice to be effected in the field. This not only provides for a considerable saving in time and effort but it permits the elimination of the large inventories otherwise required of prefabricated units formed of steel.

A material difference is also apparent in the flow characteristics of the sleeve embodying the features of this invention. Such differences in the flow characteristics are believed to contribute at least in part to the lesser force required for compression. The difference is also evidenced by the characteristics of the splice that is formed wherein it appears that the wires have been blended in with the metal to form a solid unit in cross-section having the characteristics of a fused structure wherein the elements appear to be blended one into the other in a manner which resists separation. This is believed to result in part from the non-porous characteristics of the extruded aluminum sleeve coupled with the improved grain structure and the previous cold working of the metal of which the sleeve is formed. Whatever the reason, it is evident that an improved splice of greater strength is capable of being secured with lesser force thereby to enable more efficient assembly without the limitations heretofore encountered in splicing with sleeves.

The concepts of this invention are not limited to sleeves of the shapes described. They may be embodied in a duplex unit, as illustrated in FIG. 4, wherein the sleeve member 40 is provided with a pair of bores 42 and 44 in side by side but interconnected arrangement to receive separate wires 14 and 16 which are coupled together upon compression of the sleeve between suitable dies.

It will be understood that numerous changes may be made in the details of construction, arrangement and operation without departing from the spirit of the invention, especially as defined in the following claim.

I claim:

In a collar for splicing wire rope in which the collar comprises an elongate sleeve having a bore extending continuously therethrough dimensioned to receive the portion of the rope to be spliced therein, the improvement wherein the sleeve is formed of extruded aluminum which is free of voids and a substantially oriented grain structure in which orientation follows the contour of the sleeve and extends predominantly linearly in the lengthwise direction whereby the sleeve is characterized by compressive flow at low pressures by comparison with sleeves formed of cast aluminum and whereby the aluminum of the compressed sleeve penetrates the wire rope substantially completely to blend the wires together.

References Cited in the file of this patent

UNITED STATES PATENTS 2,614,053    Bobb                  Oct. 14, 1952

FOREIGN PATENTS 868,788    Germany             Feb. 26, 1953

OTHER REFERENCES

Metals Handbook, American Society For Metals, 1948 edition; pages 44 and 770. (Copy in Division 3.)